US009705953B2

(12) United States Patent
Moorer (10) Patent No.: US 9,705,953 B2
(45) Date of Patent: Jul. 11, 2017

(54) LOCAL CONTROL OF DIGITAL SIGNAL PROCESSING

(71) Applicant: Adobe Systems Incorporated, San Jose, CA (US)

(72) Inventor: James Anderson Moorer, Panacea, FL (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 927 days.

(21) Appl. No.: 13/919,042

(22) Filed: Jun. 17, 2013

(65) Prior Publication Data

US 2014/0371891 A1 Dec. 18, 2014

(51) Int. Cl.
*G06F 17/00* (2006.01)
*H04L 29/06* (2006.01)
*G11B 27/031* (2006.01)

(52) U.S. Cl.
CPC .......... *H04L 65/604* (2013.01); *G11B 27/031* (2013.01); *H04L 65/4015* (2013.01); *H04L 65/601* (2013.01)

(58) Field of Classification Search
CPC . H04L 65/604; H04L 65/4015; H04L 65/601; G11B 27/034; G11B 27/105; G10H 1/0033; G10H 1/365; G10H 2240/131; H04N 21/8113; G06F 17/3074
See application file for complete search history.

(56) References Cited

U.S. PATENT DOCUMENTS 8,085,269 B1 12/2011 Classen
8,301,076 B2 10/2012 Grandinetti et al.
8,325,944 B1 12/2012 Duwenhorst et al.
2009/0079833 A1* 3/2009 Abraham ............. G10H 1/0008
348/169
2010/0306373 A1* 12/2010 Wormley ............ H04L 67/1029
709/224

(Continued)

OTHER PUBLICATIONS

Press Release, "Adobe Anywhere Launches at NAB 2013" (Apr. 4, 2013), downloaded from http://www.adobe.com/aboutadobe/pressroom/pressreleases/pdfs/201304/040413AdobeAnywhere.pdf.

(Continued)

*Primary Examiner* — Fan Tsang
*Assistant Examiner* — David Siegel
(74) *Attorney, Agent, or Firm* — Finch & Maloney PLLC (57) ABSTRACT

Techniques are disclosed for facilitating digital signal processing in a client-server computing environment. In one embodiment, a local computing device is used to playback a digital media asset that is processed by a digital signal processing server. The local computing device can be configured to provide a user interface that receives a user selection of the segment of the media asset that is to be modified, and responsive to such selection, that instructs the digital signal processing server to segment the media asset accordingly. The "segmented mix", which includes the user-selected portion of the media asset that is to be modified, is provided to the local computing device for local processing according to the user's instructions. The "main mix", which comprises the other non-selected portions of the media asset, continues to be processed by the digital signal processing server and provided to the local computing device for playback.

21 Claims, 4 Drawing Sheets

(56) References Cited

U.S. PATENT DOCUMENTS

2012/0245718 A1    9/2012  Condit et al.
2013/0010975 A1    1/2013  Tsingos et al.
2014/0133683 A1*   5/2014  Robinson ................ H04S 3/008
                                                          381/303

OTHER PUBLICATIONS

Whitepaper, "Adobe Anywhere for Video" (2013), downloaded from http://wwwimages.adobe.com/www.adobe.com/content/dam/Adobe/en/products/anywhere/pdfs/Adobe%20Anywhere%20whitepaper.pdf.

* cited by examiner

LOCAL CONTROL OF DIGITAL SIGNAL PROCESSING

FIELD OF THE DISCLOSURE

This disclosure relates generally to digital signal processing, and more specifically to methods for providing local control of digital signal processing in a client-server computing environment.

BACKGROUND

A wide variety of audio sources can be used to generate audio signals. Examples of such audio sources include radio receivers, turntables, compact disc players, MP3 players and synthesizers. Audio signals can also be generated by a microphone associated with a particular audio source, such as a musician playing an instrument or a vocalist singing in a band. In musical settings such as these, dozens of microphones can be used to generate dozens of corresponding audio signals. For example, a drum set alone may be associated with five or more microphones. Groups of instruments, such as in an orchestral setting, may have one or more microphones in common. In addition, single instruments are often associated with one or more dedicated microphones. Because they are generated from a wide range of audio sources, audio signals generally have a correspondingly wide range of properties, such as intensity, number of channels (stereophonic or monophonic), and phase. The properties of multiple audio signals can be modified in relation to each other and the modified audio signals can be combined to form a sound recording, wherein each audio signal corresponds to a "track" of that sound recording. This process of modification and combination is called mixing and is performed using a device called a mixer. A digital audio workstation can be used to mix digital audio signals using a personal computer or a portable computer. As the processing power of modern computer systems continues to grow, it has become increasingly common to use digital audio workstations for a wide range of digital audio processing tasks, including tasks that involve not only digital audio signals, but also related multimedia assets, such as digital video signals.

DETAILED DESCRIPTION

Techniques are disclosed for facilitating digital signal processing, such as the processing of a digital audio signal, in a client-server computing environment. In one embodiment, a local computing device is used to playback a digital media asset, such as a music or video file, that is remotely processed by a digital signal processing server. The user of the local computing device may wish to modify certain segments of the digital media asset as it is played back. For example, where the digital media asset is a multi-track sound recording of an orchestral performance, the user may wish to apply a subtle reverb effect to a particular track associated with audio provided by a guitar. The local computing device can be configured to provide a user interface that receives a user selection of the segment of the media asset that is to be modified, and responsive to such selection, that instructs the digital signal processing server to segment the media asset accordingly. In such embodiments, the "segmented mix", which includes the user-selected portion of the media asset that is to be modified, is provided to the local computing device for local processing according to the user's instructions. The "main mix", which comprises the other non-selected portions of the media asset, continues to be processed by the digital signal processing server and provided to the local computing device for playback. However, before the local computing device plays the media asset, the segmented mix is synchronized with the main mix, such that a person listening to the resulting audio output may be unaware that the underlying processing was segmented between two different computer systems. This advantageously allows the user of the local computing device, which might have limited computing resources, to remotely leverage the processing power of a more powerful digital signal processing server, while still being able to perform real-time modification of the media asset. Numerous configurations and variations of such techniques will be apparent in light of this disclosure.

General Overview

As the processing capacity of portable computing devices such as smartphones and tablet computers has grown, consumers have become accustomed to using such devices for an increasingly wide variety of applications. However, notwithstanding these technological advances, such devices still often have diminished processing capacity compared to mainframe computers or even desktop computer systems. As a result, consumers still frequently find themselves constrained by the processing capacity of their portable devices. These constraints are especially evident in the field of digital signal processing, which can be particularly computationally intensive. One example of such a computationally intensive use is the generation of a large, complicated mix of a multi-track digital sound recording using a digital audio workstation. In applications such as this, consumers therefore still find it advantageous to use a more powerful server computer. However, when performing many digital signal processing operations, it is also desirable to have near real-time feedback as changes are made to the digital media asset. This can make working with a remote server system cumbersome, regardless of its processing capacity.

Thus, and in accordance with an embodiment of the present invention, techniques are provided herein that facilitate local control of digital signal processing in a client-server computing environment. In such an embodiment, server-side processing of a digital media asset is altered to temporarily exclude a segment of the asset and to send the excluded segment to a local device for real-time processing based on user instructions provided at the local device. The non-excluded segments of the asset are processed by the server as usual and are transmitted to the local device where they are synchronized with the locally processed segment of the asset in real-time, thereby providing the user with direct feedback based on the changes made to the locally processed segment. This provides a seamless process to the user, from whose perspective it appears that the asset is mixed locally, even though most of the processing is performed by the server. This example technique for local control of digital signal processing can be applied to production and processing of a wide variety of digital media assets, including audio assets, video assets and multimedia assets.

When a multi-track sound recording is mixed, typically only one of the tracks comprising the sound recording is adjusted at a given time. In addition, there is usually relatively little interaction among the multiple tracks, and where such interaction does exist, the relationship between interacting tracks is typically well-defined, such as in the case of stereo pairs or linked surround channels. Thus, when a user wishes to modify a selected track, that track and any linked stereo or surround channels can typically be modified and processed separately from the remaining tracks in the sound recording. This allows real-time, interactive processing of a small number of tracks to be performed using a local device, thereby reducing the likelihood that the processing capacity of the local device will constrain the operation. This also makes it feasible to perform complex mixing operations using a portable local device with reduced processing capacity, such as a smartphone or tablet computer.

In one embodiment a user initiates local processing of a multi-track sound recording by identifying a small number of tracks that are to be modified. The small number of tracks may comprise as few as one track, or in the case of linked stereophonic tracks, two, three, four, five, or six tracks. Additional tracks may be processed locally in other embodiments, although the larger the number of locally processed tracks, the greater the computational processing power that should be provided by the local computing device. The user's selection can be made before or during playback of the sound recording, for example by simply by accessing a control on a digital audio workstation. Thus the methodologies disclosed herein are generally compatible with existing digital audio workstation tools that provide a visual representation of processing controls associated with a multi-track sound recording, and that provide a touch-based user interface of the type that is typically used with portable devices such as smartphones and tablet computers.

Upon receiving the user's selection, a digital signal processing server can be configured to extract the selected track or tracks from the sound recording for routing to the local device. The digital signal processing server can also be configured to send baseline processing instructions to the local device that allow the local device to establish local baseline processing to be identical to that which is performed at the server. Thus, for example, if the digital signal processing server is configured to apply a 60 Hz hum filter to all tracks of the sound recording, the server will send processing instructions to the local device indicating that a 60 Hz hum filter should also be applied to the locally processed tracks. The selected track or tracks are then excluded from further processing by the digital signal processing server. Once the selected track or tracks are routed to the local device for processing, the remaining tracks are processed as usual by the digital signal processing server and then forwarded to the local device for playback. The local device, on the other hand, processes the selected track or tracks according to the user's instructions and synchronizes the locally and remotely processed tracks for real-time playback. The locally and remotely processed tracks are synchronized in a simple-accurate manner by locating and synchronizing particular sampled locations in the locally and remotely processed tracks. This enables the switch from remote to local processing to be seamless or nearly seamless from the user's perspective.

In certain embodiments, as the user manipulates processing controls for the locally processed track or tracks in real-time, the local computing device is configured to compile the user's changes into processing change data which is subsequently sent back to the digital signal processing server. This allows the overall sound recording to be updated based on the user's locally-processed modifications. This process can be repeated as the user selects and modifies individual different tracks comprising the sound recording. Thus, in general, all tracks of a massive mix can be modified by even simple portable computing devices by leveraging server resources to perform most of the processing, and automatically partitioning the process to allow local processing of a small number of tracks in a way that appears substantially seamless to the user. In particular, the user will be unaware that the modified track is being processed locally since establishing the partition and initiating local processing can be configured to occur automatically in response to the user's selection of a track to be modified. This enables a user with a portable computer having limited processing capacity to assemble, edit and process a large audio project that would normally require the resources of elaborate digital audio workstation. This also facilitates geographically-unlimited collaboration on a large project that involves editing and processing of media assets since geographically distributed users can access and edit the media asset on a segmented basis without requiring exclusive access to the entire asset. Any user capable of accessing a digital signal processing server can work collaboratively with media assets managed by that server.

It will be appreciated that such methodologies can be applied to not only sound recordings, but also to the processing of a wide variety of digital media assets, including audio assets, video assets and multimedia assets. Such assets can be stored in a wide variety of file formats. For example, audio assets can be stored using file formats such as the waveform audio file format (WAV), the audio interchange file format (AIFF), any suitable file format defined by the Moving Picture Experts Group (MPEG) including MPEG-4 and MP3, any suitable file format using advanced audio coding (AAC), or any other suitable compressed or uncompressed file format capable of recording audio waveforms that represent sound recordings and/or other discrete audio samples. In certain embodiments audio assets comprising note lists and instrument descriptions for music synthesis can be recorded and stored using the musical instrument digital interface (MIDI) standard. Video assets can be stored using any suitable file formats defined by the MPEG including MPEG-4, as a sequence of frames defined in a color space such as RGB or YUV, or any other suitable compressed or uncompressed file format, including file formats generated in real-time by animation engines, compositing engines or other video generation applications. Video assets can be accessed by the system in conjunction with, for example, the editing of an audio asset that is to be used in a sound for picture application. In general, it will be appreciated that the methodologies disclosed herein can be applied to a wide variety of media assets stored in a wide variety of formats, and are not intended to be limited to any particular asset type or storage format.

System Architecture

Figure 1:
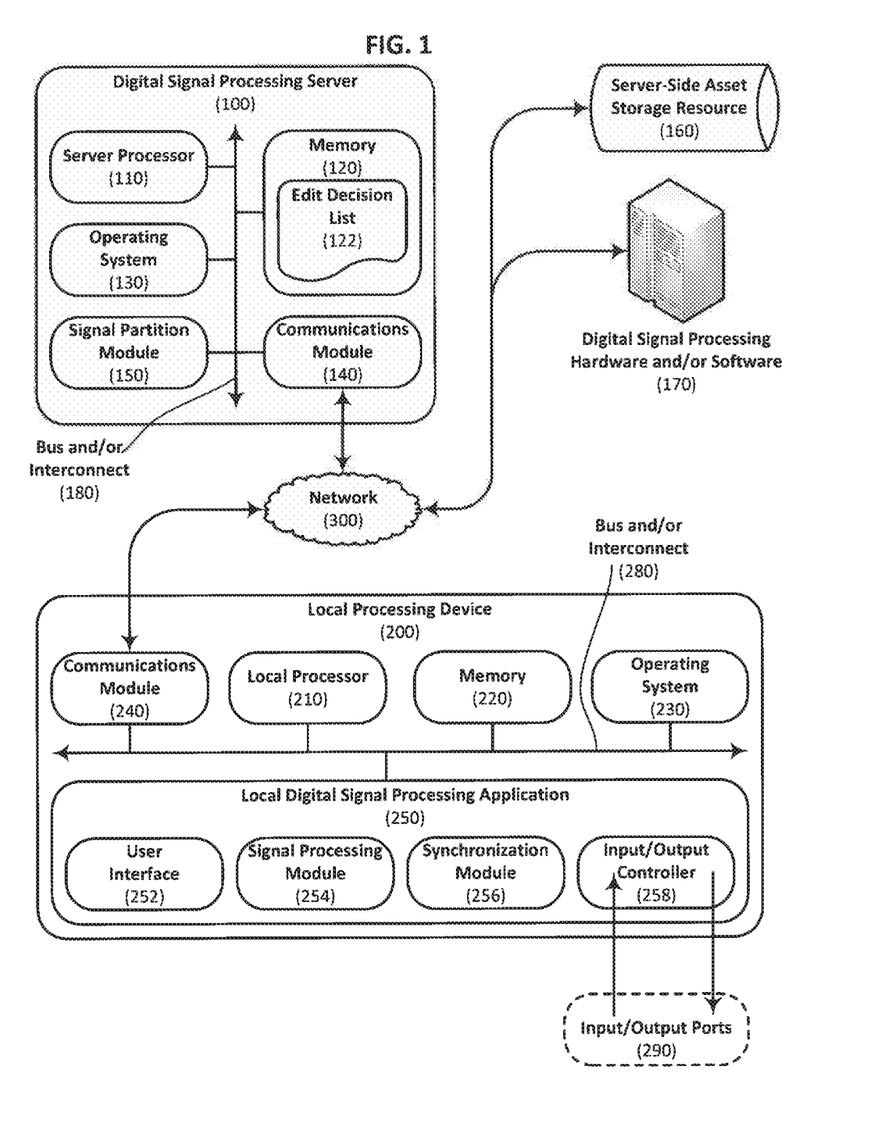
FIG. 1 is a block diagram schematically illustrating selected components of a computer system that can be used to provide local control of digital signal processing in a client-server environment according to certain embodiments of the present invention.

FIG. 1 is a block diagram schematically illustrating selected components of a computer system that can be used to provide local control of digital signal processing in a client-server environment according to certain embodiments of the present invention. As illustrated, the methodologies disclosed herein can be viewed as a series of interactions between a digital signal processing server 100 and a local processing device 200. These computer systems may comprise, for example, one or more devices selected from a desktop or laptop computer, a workstation, a tablet, a smartphone, a set-top box or any other such computing device. A combination of different devices may be used in certain embodiments. For example, in one embodiment digital signal processing server 100 comprises an application server capable of responding to and fulfilling requests for access to shared resources provided by the server, while local processing device 200 comprises a tablet computer capable of accessing the resources managed by the server. One example of such a tablet computer is an iPad (Apple Inc., Cupertino, Calif.) leveraging the processing resources provided by a graphics processing unit (GPU). Server 100 and local processing device 200 of the example embodiment illustrated in FIG. 1 each include, among other things, a processor 110, 210; a memory 120, 220; an operating system 130, 230; and a communications module 140, 240. As can be further seen, a bus and/or interconnect 180, 280 is also provided to allow for inter- and intra-device communications using, for example, communications module 140, 240. Server 100 and local processing device 200 are coupled to a network 300 to allow for communications with each other, as well as with other resources and/or devices, such as a server-side asset storage resource 160 and/or digital signal processing hardware and/or software 170. Other componentry and functionality not reflected in the illustrations will be apparent in light of this disclosure, and it will be appreciated that the claimed invention is not intended to be limited to any particular hardware configuration. Thus in other embodiments digital signal processing server 100 and local processing device 200 may comprise additional or alternative subcomponents as compared to those illustrated in FIG. 1.

Processors 110, 210 can be any suitable processors, and may include one or more coprocessors or controllers, such as an audio processor or a GPU, to assist in respective processing operations of server 100 and/or local processing device 200. Memory 120, 220 can be implemented using any suitable type of digital storage, such as one or more of a disk drive, a universal serial bus (USB) drive, flash memory and/or random access memory (RAM). Operating systems 130, 230 can be implemented with any suitable operating system, such as Linux or FreeBSD in the case of server operating system 130, or Google Android, Microsoft Windows or Apple OS X in the case of local operating system 230. As will be appreciated in light of this disclosure, the techniques provided herein can be implemented on any similar existing or subsequently-developed platform. Communications modules 140, 240 can be any suitable network chip or chipset which allows for wired and/or wireless communication to network 300 such that server 100 and local processing device 200 can communicate with other local and/or remote computing resources and/or devices. Network 300 may be a local area network (such as a home-based or office network), a wide area network (such as the Internet) or a combination of such networks, whether public, private or both. In some cases access to resources on a given network or computing system may require credentials such as usernames, passwords and/or any other suitable security mechanism.

Still referring to the example embodiment illustrated in FIG. 1, digital signal processing server 100 includes a signal partition module 150. Signal partition module 150 can be used, for example, to separate one or more selected tracks from a multi-track sound recording. This generates two distinct media assets: the partitioned track or tracks which are to be locally processed (the segmented mix), and the remaining track or tracks which are to be processed at the server (the main mix). In some cases, signal partition module 150 can be configured to segment not only a selected track, but also one or more additional tracks that are paired or linked to the selected track, as may be useful in the case of linked stereo or surround channels. In such case the selection of paired or linked tracks can be performed automatically in a process that is transparent to the user. The segmented mix may include one, two, three, four, five, six, or more tracks, although the larger the number of locally processed tracks, the greater the computation processing power that should be provided by local processing device 200.

Segmentation of a media asset may also optionally include segmentation of an edit decision list (EDL) containing processing instructions for the media asset. An EDL is a data structure containing editing decisions, processing directives, and timestamps indicating how such decisions and directives should be applied to a media asset. Thus it will be appreciated that the EDL may include processing information other than editing decisions. Segmentation of information provided in an EDL advantageously allows common processing to be uniformly applied to both the segmented mix during local processing and the main mix during server-side processing. For example, if the digital signal processing server is configured to apply a 60 Hz hum filter to all tracks of a sound recording, then partitioning of that sound recording will cause processing instructions to be generated indicating the 60 Hz hum filter should be applied to the segmented mix. Other frequently applied common processing instructions may include application of effects such as reverberation, de-noising and/or pitch shifting. Such processing instructions can be provided to local device 200 with the segmented mix, thereby enabling common processing to be applied to all segments of a media asset, regardless of whether such segments are processed by a server device or a local device. Partitioning an EDL is generally straightforward, given that there is usually relatively little interaction among the tracks of a multi-track sound recording, and further given that where such interaction does exist, the relationship between interacting tracks is typically well-defined, such as in the case of stereo pairs or linked surround channels which will likely be processed together in any event. This allows the EDL to be easily partitioned on-the-fly in response to real-time processing instructions made by a user during playback of a media asset in a process that appears seamless to the user. An EDL is typically associated and stored with a corresponding media asset, and as such, may be stored in memory 120, such as EDL 122 illustrated in FIG. 1, or in server-side asset storage resource 160.

Digital signal processing server 100 is optionally provided with access, via network 300, to other resources and/or devices, such as server-side asset storage resource 160 and/or digital signal processing hardware and/or software 170. For example, in one embodiment server-side asset storage resource 160 comprises a device having a redundant array of independent disks (RAID), although other cloud-based storage resources can be used additionally or alternatively in other embodiments. Such storage resources can be used to store media assets which can be accessed by digital signal processing server 100 and processed according to the techniques disclosed herein. These resources can be provided as a supplement to or as an alternative to the storage provided by server memory 120. Likewise, digital signal processing hardware and/or software 170 may be used to provide additional processing capability beyond that provided by server processor 110. Such additional processing capability can be provided, for example, by large-scale audio and/or video rendering software applications that are capable of processing large numbers of complex multimedia assets, such as multi-track sound recordings, simultaneously. Such additional processing capacity may additionally or alternatively be provided by dedicated hardware as well, such as by one or more audio or graphical processing units.

Figure 4:
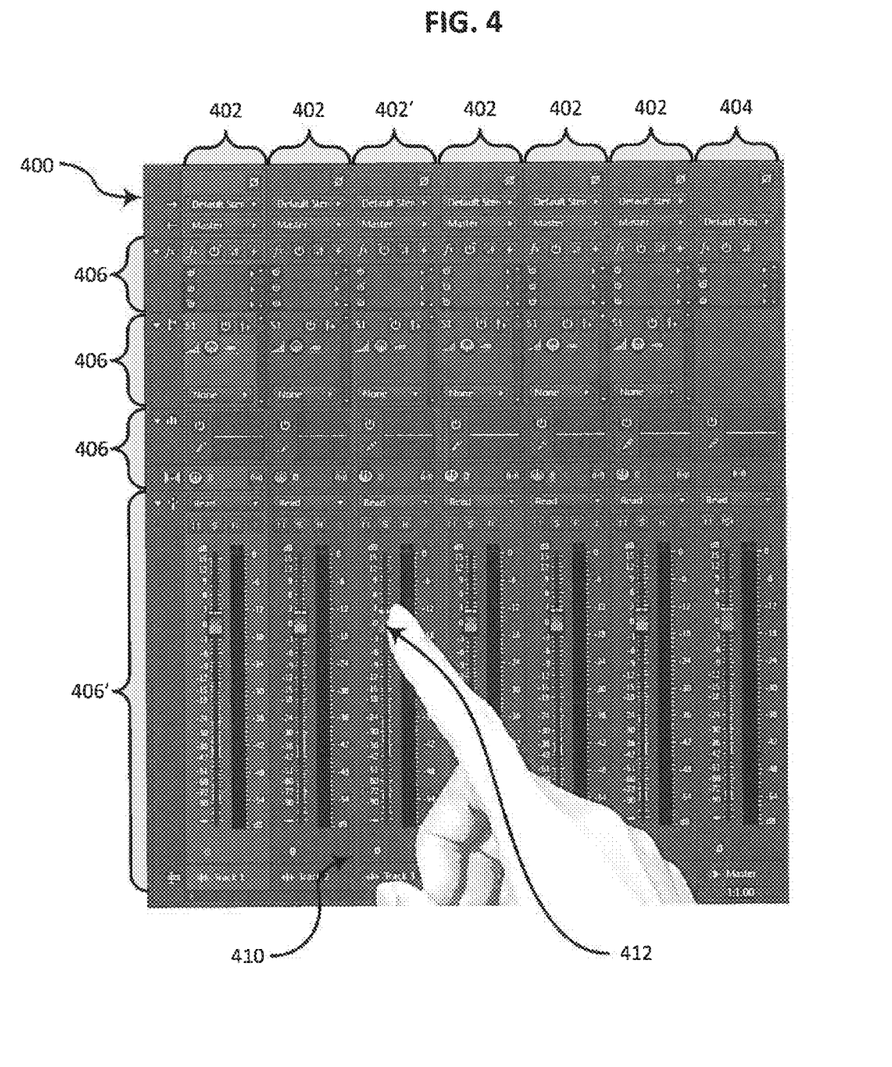
FIG. 4 illustrates an example user interface that can be used to provide local control of digital signal processing in a client-server environment according to certain embodiments of the present invention.

Still referring to the example embodiment illustrated in FIG. 1, local processing device 200 includes a local digital signal processing application 250. In certain embodiments application 250 comprises a digital audio workstation specifically designed for the manipulation of digital audio, video and/or multimedia assets. Examples of such applications include Adobe® Audition® CC (Adobe Systems Incorporated, San Jose, Calif.), FL Studio (Image-Line Software, Sint-Martens-Latem, Belgium), and Cubase (Steinberg Media Technologies, Hamburg, Germany). Digital audio workstations are generally capable of recording audio signals generated by an audio source and processing such audio signals. While most audio signal processing is applied to recorded signals, it can also be performed in real-time in conjunction with the recording of live sound. A digital audio workstation will typically include a user interface 252 capable of displaying a virtual multi-track mixing console. Such a user interface may include transport controls for recording, playing, and cueing sound recordings; track controls for manipulating the tracks that comprise a sound recording; and a waveform display for providing a visual image of a waveform representing a sound recording. Additional or alternative user interface elements may be provided in other embodiments. Local caching and speculative look-ahead can be used to reduce play start latency at device 200. User interface 252 can be configured to work with a variety of different hardware platforms, including touchscreen devices and mobile devices, and thus in one embodiment the local digital signal processing application 250 is embodied in an application running on a smartphone or tablet computer having a touch-sensitive display. In certain embodiments user interface 252 is configured to provide access to functionality associated with, for example, a signal processing module 254, a synchronization module 256 and an input/output controller 258. FIG. 4 illustrates the visual appearance of an example user interface, which will be described in greater detail in turn.

Signal processing module 254 can be configured to provide local processing of one or more digital signals according to given processing instructions, and synchronization module 256 can be configured to synchronize locally and remotely processed signals. For example, in certain embodiments signal processing module 254 receives a segmented mix from digital signal processing server 100, and processes the segmented mix according to both (a) user instructions provided via user interface 252, and (b) processing instructions received from server 100. Examples of signal processing that may be provided by signal processing module 254 include one or more of adjusting volume, balancing, filtering, applying special effects, applying reverberation, denoising, pitch shifting or any other suitable digital signal processing techniques. In such embodiments signal processing module 254 can also be configured to generate processing change data that provides a record of the processing that is performed; such data can be compiled in the form of an EDL associated with the segmented mix. The EDL generated by signal processing module 254 optionally includes appropriate timestamps to facilitate its incorporation into a master EDL associated with the media asset, such as EDL 122 stored in server memory 120. Synchronization module 256 can be configured to synchronize a locally-processed segmented mix with a remotely-processed main mix received from server 100.

As illustrated in FIG. 1, local digital signal processing application 250 includes input/output controller 258 which is configured to (a) provide audio signals to audio output devices such as speakers, headphones, earpieces, amplifiers and recording devices, and (b) receive audio signals from audio input devices such as microphones, synthesizers, and playback devices. In certain embodiments audio input and output devices can optionally be coupled to the local processing device 200 via one or more input/output ports 290. However in other embodiments the local processing device 200 includes one or more integrated speakers. In still other embodiments input/output controller 258 can be configured to interface with an antenna, such as a Bluetooth antenna, which can be used to exchange audio signals with one or more wireless devices such as wireless headphones, a wireless microphone or a wireless car audio system. Regardless of how a processed media asset is played back, input/output controller 258 allows a user of the local processing device 200 to have real-time feedback based on the processing instructions provided via user interface 252.

The various embodiments disclosed herein can be implemented in various forms of hardware, software, firmware and/or special purpose processors. For example in one embodiment a non-transitory computer readable medium has instructions encoded thereon that, when executed by one or more processors, cause one or more of the digital signal processing methodologies disclosed herein to be implemented. The instructions can be encoded using a suitable programming language, such as C, C++, object-oriented C, JavaScript, or BASIC, or alternatively, using custom or proprietary instruction sets. The instructions can be provided in the form of one or more computer software applications and/or applets that are tangibly embodied on a memory device, and that can be executed by a computer having any suitable architecture. In another embodiment, the system can be hosted on a given website and implemented, for example, using JavaScript or another suitable browser-based technology. For instance, as described above, in certain embodiments the computer software application is a digital audio workstation specifically designed to enable digital audio, video and/or multimedia assets to be manipulated by a user of a portable computing device. In other embodiments the functionalities disclosed herein can be incorporated into other software applications, such as video editing applications, audio recording applications, or other content generation, modification and/or management applications. The computer software applications disclosed herein may include a number of different modules, sub-modules or other components of distinct functionality that can provide information to, or receive information from, other components. These modules can be used, for example, to communicate with input and output devices such as pointing devices, display screens, touchscreens, and/or other user interface elements.

The non-transitory computer readable medium may be any suitable medium for storing digital information, such as a hard drive, a server, flash memory and/or random access memory. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output pots for receiving and outputting data, and a number of embedded routes for carrying out the various functionalities disclosed herein. It will be apparent that any suitable combination of hardware, software and firmware can be used, and that the present invention is not intended to be limited to any particular system architecture.

Methodology

Figure 2:
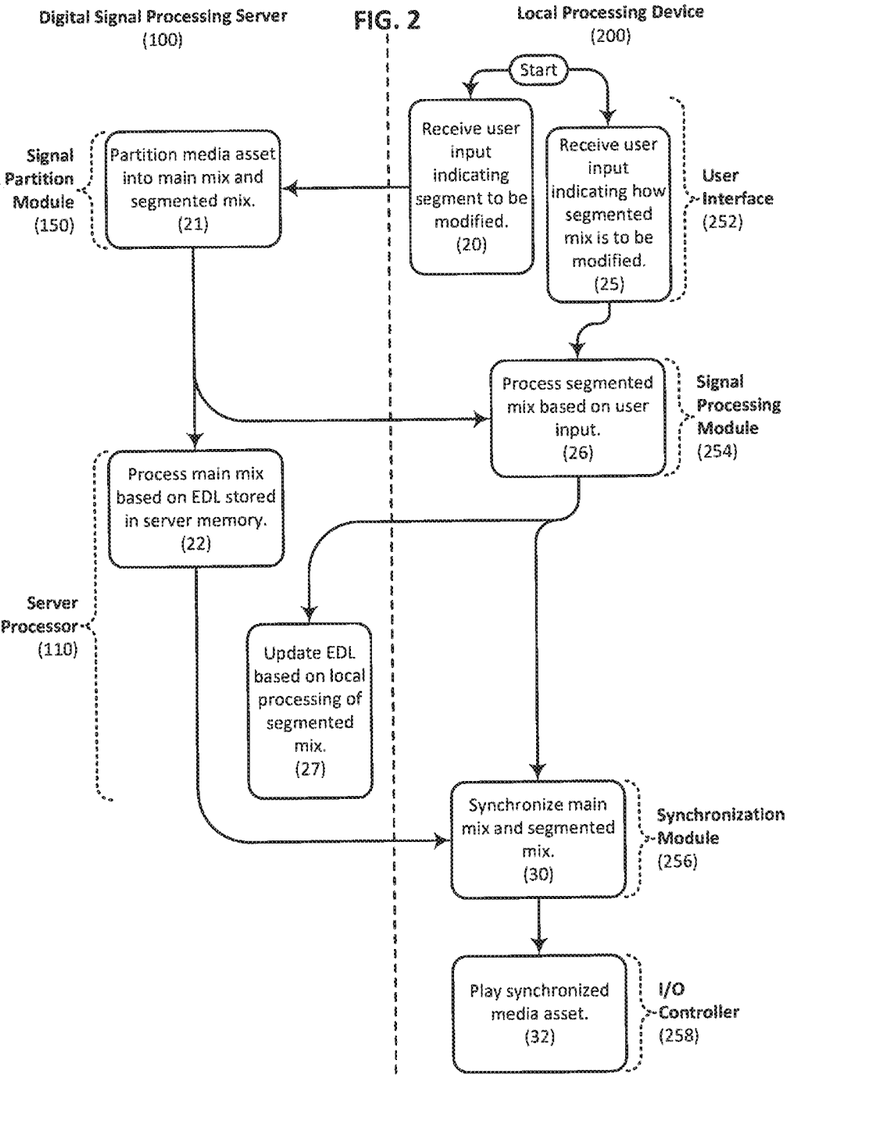
FIG. 2 is a flowchart illustrating an example technique for using the computer system of FIG. 1 to provide local control of digital signal processing in a client-server environment according to certain embodiments of the present invention.
Figure 3:
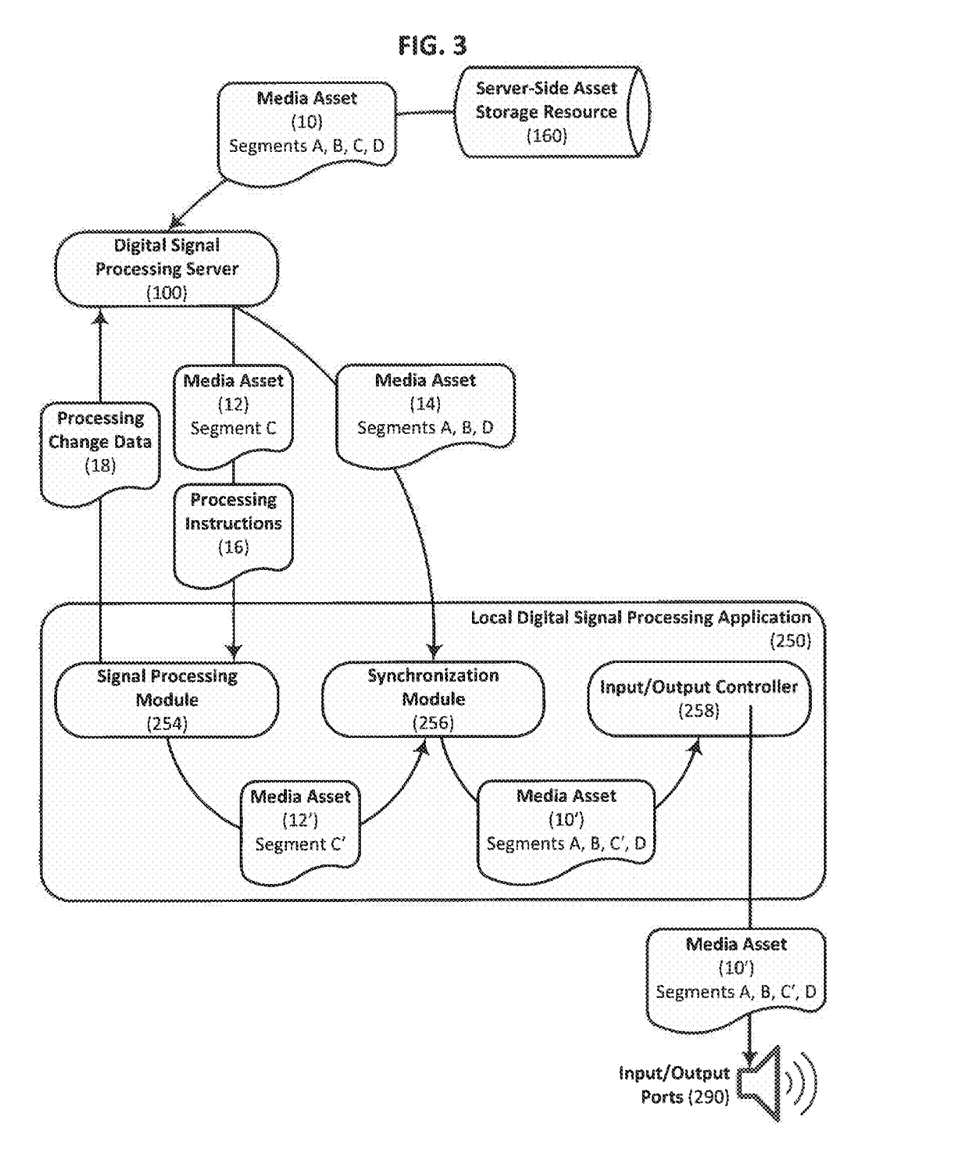
FIG. 3 is a block diagram schematically illustrating how data is exchanged amongst selected components of the computer system of FIG. 1 according to certain embodiments of the present invention.

FIG. 2 is a flowchart illustrating an example technique for providing local control of digital signal processing in a client-server environment according to certain embodiments of the present invention. FIG. 3 is a block diagram schematically illustrating how data is exchanged amongst selected components of the digital signal processing server 100 and the local processing device 200 according to certain embodiments of the present invention. As can be seen, these example methodologies include a number of phases and sub-processes, the sequence of which may vary from one embodiment to another. However, when considered in the aggregate, these phases and sub-processes form a complete digital signal processing function that is responsive to user commands in accordance with certain of the embodiments disclosed herein. The methodology can be implemented, for example, using the system architecture illustrated in FIG. 1, as described above. However, other system architectures can be used in other embodiments, as will be apparent in light of this disclosure. To this end, the correlation of the various functions shown in FIGS. 2 and 3 to the specific components illustrated in FIG. 1 is not intended to imply any structural and/or use limitations. Rather, other embodiments may include, for example, varying degrees of integration wherein multiple functionalities are effectively performed by one system, such as where a single module is used to process a segmented mix and synchronize it with a remotely processed main mix. Thus, other embodiments may have fewer or more modules depending on the granularity of implementation. Numerous variations and alternative configurations will be apparent in light of this disclosure.

As illustrated in FIG. 2, in one embodiment the digital signal processing methodology commences with receiving 20 user input indicating a selected segment of a media asset that is to be modified. The selected segment may correspond to one or more tracks of a multi-track sound recording. Such a selection can be made via user interface 252, for example by interacting with a user interface control associated with a track corresponding to the selected segment. For instance, in an embodiment where the user wishes to adjust the volume of a snare drum in a multi-track sound recording, a track associated with the snare drum can be selected by simply touching a volume slider on a touchscreen-based user interface provided by a digital audio workstation application on a smartphone. The selection is facilitated in embodiments wherein user interface 252 provides a virtual representation of available processing controls for the various tracks comprising a media asset, because this allows the user to select a particular track with a single touch, click, or other indication. The selection can be made without regard to whether the media asset is queued for future playback or is actively being played back at the time of the selection. Where the media asset is actively being played back when the selection is made, signal processing associated with such playback can be provided by digital signal processing server 100 until the selection is made.

The user's selection of a segment to be modified can be forwarded to digital signal processing server 100, where the media asset is partitioned 21 into a segmented mix and a main mix by signal partition module 150. In such embodiments, the segmented mix comprises waveform data corresponding to the segment of the media asset selected by the user, while the main mix comprises waveform data corresponding to the non-selected segments of the media asset. Thus in some cases the segmented mix may comprise a single track while the main mix comprises multiple tracks; in other cases both the segmented and main mixes may each comprise multiple tracks. Thus, even where the user selects a single track for local processing, in some cases one or more additional tracks that are paired or linked to the selected track are included in the segmented mix, as may be useful in the case of linked stereo or surround channels. In addition, signal partition module 150 may also be configured to segment an EDL containing processing instructions for a given media asset, such as EDL 122 stored in memory 120. EDL segmentation allows common baseline processing to be uniformly applied to both the segmented mix during local processing and the main mix during server-side processing. In such cases, signal partition module 150 can be configured to not only generate the segmented and main mixes, but can also be configured to generate processing instructions that can be used by local processor 210 to provide uniform application of baseline processing. As illustrated in FIG. 2, after segmentation occurs the main mix can be processed 22 by server processor 110. Such processing may be based on EDL 122 stored in server memory 120, but may exclude any tracks provided in segmented mix.

For example, FIG. 3 schematically illustrates how data is exchanged amongst selected components of the systems disclosed herein during playback of a media asset 10 that is stored in server-side asset storage resource 160. For purposes of simplicity, media asset 10 can be understood as comprising Segments A, B, C, and D, although the techniques disclosed herein are equally applicable to media assets comprising more than or fewer than four segments. Each of Segments A, B, C, and D can be understood as corresponding to one or more tracks of a multi-track sound recording, although in general they represent arbitrarily defined segments of any suitable media asset. As illustrated, digital signal processing server 100 can be configured to retrieve media asset 10 from server-side asset storage resource 160, and signal partition module 150 can be configured to segment media asset 10 into media asset 12 comprising only Segment C (the segmented mix) and media asset 14 comprising the remaining Segments A, B, and D (the main mix). Signal partition module 150 can also be configured to generate processing instructions 16 that can be used by local digital signal processing application 250 to provide uniform baseline processing, including any automated processing. Timestamps may be included in processing instructions 16 to enable the local and remote baseline processing to be implemented in a way that is both accurate and transparent to the user. As illustrated, media asset 12 (the segmented mix) and processing instructions 16 are provided to local digital signal processing application 250 for local processing, while media asset 14 (the main mix) are remotely processed by digital signal processing server 100. Media asset 14 can be processed based on information contained in EDL 122 stored in memory 120, as illustrated in FIG. 1.

Referring again to the digital signal processing methodology illustrated in FIG. 2, receiving 20 user input indicating the selected segment of the media asset that is to be modified may also comprise receiving 25 user input indicating specifically how the resulting segmented mix is to be modified. For example, if a user wishes to adjust the volume of a snare drum in a multi-track sound recording, the user can simply:

(a) touch a volume slider corresponding to the snare drum on user interface 252, thereby indicating selection of the segment of the sound recording to be modified (see reference numeral 20 in FIG. 2); and (b) move the volume slider in a way that corresponds to the desired volume adjustment, thereby indicating specifically how the selected segment is to be modified (see reference numeral 25 in FIG. 2).

Thus an interaction with user interface 252 that is as simple as dragging a slider or turning a dial can correspond to the receipt of user instructions with respect to both what segments of the media asset are to be modified, as well as how such segments are to be modified. However, it will be appreciated that the present invention is not intended to be limited to any particular user interface configuration, and that other user interface techniques may be implemented in other embodiments. For example, in a modified embodiment the user interface can be configured to respond to separate interactions that correspond to selection of a segment of the media asset and modification of the selected segment.

Still referring to the example embodiment illustrated in FIG. 2, signal processing module 254 processes 26 the segmented mix recited from signal partition module 150 according to both (a) user instructions provided via user interface 252, and (b) processing instructions received from server 100. Such processing can be performed on-the-fly in response to user input provided via user interface 252. In certain embodiments signal processing module generates processing change data that provides a record of the processing that is performed; such processing change data can be compiled in the form of an EDL associated with the segmented mix. The processing change data can be compiled based on standard workstation processing rules, such that the data generated as a result of processing the segmented mix locally is the same as the data that would be generated if the same processing were performed on the unsegmented media asset. The complied processing change data can be transmitted to server processor 110 which updates 27 an EDL associated with the media asset to include the processing performed by local processing device 200. This is illustrated schematically in FIG. 3, wherein processing change data 18 is indicated as being passed from signal processing module 254 to digital signal processing server 100. Incorporating appropriate timestamps in processing change data 18 allows such data to be integrated with an existing EDL in a straightforward manner. This methodology advantageously provides a persistent record of the processed media asset on digital processing server 100, even though a portion of the processing of the media asset may have been performed by local processing device 200.

After the main mix is processed 22 by server processor 110, it is forwarded to local processing device 100 so that it can be combined with the locally processed segmented mix. In such embodiments synchronization module 256 is configured to synchronize 30 the main mix and the segmented mix. Accurate synchronization can be accomplished when the main and segmented mixes include appropriate time stamping. Time stamping may be included in the unprocessed media asset, or if not, may be added when the unprocessed asset is partitioned by signal partition module 150. For example, FIG. 3 illustrates that media asset 12 (the segmented mix; Segment C) is processed by signal processing module 254, thereby producing modified media asset 12' corresponding to modified Segment C'. This modified media asset 12' is provided to synchronization module 256, where it is combined with remotely-processed media asset 14 (main mix; Segments A, B, and D). Synchronization module produces media asset 10' comprising remotely-processed Segments A, B and D, as well as locally-processed Segment C'. Synchronized media asset 10' can then be provided to input/output controller 258 where it is further processed for playback, for example via user interface ports 290. FIG. 2 schematically illustrates that the synchronized media asset is played 32 using input/output controller 258.

The segmented processing that underlies the method illustrated in FIG. 2 can be made seamless to the user. That is, as the user interacts with user interface 252, the user perceives the system as responding to such interactions by modifying the media asset that is provided from input/output controller 258. The locally processed changes are provided to and recorded by digital signal processing server 100, thus enabling such changes to be persisted as if all processing were performed natively by server 100. It will be appreciated that the methods schematically illustrated in FIGS. 2 and 3 can be repeated indefinitely as the user changes which segments of the media asset are to be modified. Specifically, because the system is configured to be responsive to user indication of a track to be modified, simply selecting a different control element from user interface 252 will cause the system to respond to such selection by initiating local processing of the newly selected track. Once the user releases the user interface control element, for example by lifting his/her finger from a touchscreen interface, no further modifications are made to the segmented mix and local processing automatically ends.

While the example embodiments illustrated in FIGS. 2 and 3 are described herein with respect to segmented processing of a media asset during playback, it will be appreciated that in other embodiments the same type of segmented processing can be implemented during recording, or "tracking", of a media asset. For example, where input/output controller 258 is configured to receive an audio signal provided via input/output ports 290, the received audio signal can be locally processed by signal processing module 254. Such local processing may include generating time-stamped processing change data which can be forwarded to digital signal processing server 100 with the recorded asset itself. The processing change data can be incorporated into an existing EDL present on the server itself, thereby enabling the locally recorded audio signal to be incorporated into an existing media asset managed by digital signal processing server 100. Thus it will be appreciated that the methodologies disclosed herein are not intended to be limited to segmented processing during playback of a media asset, but can also be applied in other applications such as real-time recording of media assets.

User Interface

FIG. 4 illustrates an example user interface 400 which can be used to control certain aspects of the systems and methods disclosed herein. User interface 400 is intended to provide a visualization of a multi-track audio workstation that will be familiar to users such as recording engineers and musicians who are familiar with such devices. As such, user interface 400 includes a plurality of tracks 402, each of which includes one or more controls 406. User interface 400 also optionally includes a master channel 404 via which common processing controls can be applied. Examples of controls that can be applied via user interface 400 include effect application, equalization operations, and volume controls. The number of tracks, the number of controls provided per track, and the types of controls provided are variable and/or user-configurable. In other embodiments, such parameters are hardcoded, predefined or otherwise provisioned by default. The example user interface 400 can be implemented in a wide variety of different hardware architectures, such as with a touchscreen device that allows a user to interact with the interface by simply touching controls displayed thereon, or with a pointing device, such as a mouse, that allows a user to interact with the interface by pointing and selecting. It will be appreciated that the present invention is not intended to be limited to any particular collection, layout or arrangement of user interface elements, and that other user interface configurations may be used in other embodiments.

An example implementation of the methodology provided in FIGS. 2 and 3 is also illustrated in conjunction with the user interface of FIG. 4. In this example implementation, user interface 400 is provided via a touchscreen device. Specifically, FIG. 4 illustrates that a user has selected a particular track 402' by touching a particular control 406' associated with that track. For instance, if track 402' is associated with an audio signal generated by a snare drum, selecting control 406' indicates that the user wishes to modify the volume of the snare drum in the resulting mix. Making such a selection corresponds to the sequence of receiving 20 user input indicating the segment to be modified (for example, the snare drum) and receiving 25 user input indicating how the segmented mix is to be modified (for example, a volume adjustment). FIG. 4 illustrates that the segmented processing that follows such a selection is transparent to the user, and is therefore performed seamlessly from the user's perspective. User interface 400 is optionally configured to indicate the user's selections by, for example, displaying a box 410 or some other indicia associated with selected track 402', or changing the color of a control element 412 associated with selected control 406'. Other indicia can be used in other embodiments. Such indicia can be removed when the user finishes modifying selected track 402', for example by lifting his/her finger from the touchscreen, and can be regenerated in association with a different track 402 if the user chooses to make further modifications to the sound recording. This user interface configuration advantageously provides the user with real-time feedback with respect to which segments of a media asset are currently subject to modification.

CONCLUSION

Numerous variations and configurations will be apparent in light of this disclosure. For instance, one example embodiment provides a computer-implemented method comprising receiving user input indicating a segment of a media asset that is to be modified and a modification to the segment. The method further comprises receiving the segment from a digital signal processing server. The method further comprises modifying the segment based on the modification indicated by the user input, thereby generating a modified segment. The method further comprises synchronizing the modified segment with a main mix of the media asset that is received from the digital signal processing server. In some cases (a) the media asset is a multi-track sound recording; and (b) the segment of the media asset that is to be modified corresponds to one or more tracks comprising the multi-track sound recording. In some cases (a) the media asset is a multi-track sound recording; (b) the segment of the media asset that is to be modified corresponds a selected one of a plurality of tracks comprising the multi-track sound recording; and (c) receiving the segment from the digital signal processing server comprises receiving the selected track and an additional track that is paired with the selected track. In some cases the user input corresponds to touching a virtual user interface control element that forms part of a touchscreen-based digital audio workstation user interface. In some cases the method further comprising receiving baseline processing instructions from the digital signal processing server; wherein modifying the segment includes modifying the segment based on the baseline processing instructions that were separately applied to the main mix by the digital signal processing server.

Another example embodiment of the present invention provides a computer-implemented method that comprises receiving, from a client computing device, an indication of a segment of a media asset that is to be modified. The method further comprises segmenting the media asset into a main mix and a segmented mix. The main mix excludes the segmented mix. The method further comprises sending the segmented mix to the local processing device for client-based processing. The method further comprises processing the main mix, thereby generating a processed main mix. The method further comprises sending the processed main mix to the local processing device to be synchronized with the segmented mix after the client-based processing of the segmented mix. In some cases the method further comprises (a) identifying a first track corresponding to the segment of the media asset that is to be modified; and (b) identifying an additional track corresponding to the segment of the media asset that is to be modified, wherein the additional track is stereophonically linked with the first track. In some cases segmenting the media asset further comprises generating baseline processing instructions corresponding to digital signal processing that is common to both the main mix and the segmented mix. In some cases processing the main mix is performed with reference to an edit decision list corresponding to the media asset. In some cases the method further comprises, in response to receiving the indication of the segment of the media asset that is to be modified, retrieving the media asset from a server-side asset storage resource.

Another example embodiment of the present invention provides a digital signal processing server system that comprises a memory device. The system further comprises a signal partition module configured to partition a media asset into a main mix and a segmented mix. The main mix excludes the segmented mix. The system further comprises a digital signal processor configured to (a) process the main mix based on an edit decision list stored in the memory device and (b) update the edit decision list based on processing instructions received from a local processing device. The processing instructions are associated with processing of the segmented mix performed by the local processing device. In some cases the digital signal processor is further configured to access supplemental processing resources provided by a networked digital signal processing hardware resource. In some cases (a) the signal partition module is further configured to generate baseline processing instructions corresponding to baseline processing of the segmented mix; and (b) the baseline processing instructions are generated based on data extracted from the edit decision list. In some cases the signal partition module is further configured to incorporate corresponding timestamps into the main mix and the segmented mix.

Another example embodiment of the present invention provides a digital signal processing system that comprises a user interface configured to receive user input indicating a segment of a media asset that is to be modified and a modification to the segment. The system further comprises a signal processing module configured to process the segment based on the modification indicated by the user input, thereby generating a modified segment. The system further comprises a synchronization module configured to synchronize the modified segment with a main mix of the media asset that is received from a digital signal processing server system, thereby generating a synchronized media asset. In some cases the modification is selected from the group consisting of adjustment to volume, application of a filter, and application of an audio effect. In some cases the signal processing module is further configured to generate processing change data that corresponds to the modification indicated by the user input. In some cases the system further comprises an input/output controller configured to further process the synchronized media asset for playback.

Another example embodiment of the present invention provides a computer program product encoded with instructions that, when executed by one or more processors, causes a process to be carried out. The process comprises receiving user input indicating a segment of a media asset that is to be modified, and a modification to the segment. The process further comprises receiving the segment from a digital signal processing server. The process further comprises modifying the segment based on the modification indicated by the user input, thereby generating a modified segment. The process further comprises synchronizing the modified segment with a main mix of the media asset that is received from the digital signal processing server. In some cases the modification is selected from the group consisting of adjustment to volume, application of a filter, and application of an audio effect. In some cases the process further comprises (a) generating processing change data that corresponds to the modification indicated by the user input; and (b) sending the processing change data to the digital signal processing server.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method comprising:
   receiving, at a client computing device, user input indicating a segment of a media asset that is to be modified and a modification to the segment;
   segmenting, at a digital signal processing server, the media asset into a main mix and a segmented mix, wherein the main mix excludes the segmented mix and wherein the segmented mix includes the segment of the media asset indicated by the user input;
   wherein the segmenting the media asset further comprises generating, at the digital signal processing server, baseline processing instructions corresponding to digital signal processing that is common to both the main mix and the segmented mix, wherein the baseline processing instructions are generated based on data extracted from an edit decision list corresponding to the media asset;
   processing the main mix at the digital signal processing server, wherein processing the main mix is performed with respect to the edit decision list;
   receiving the segment at the client computing device in a first transmission sent from the digital signal processing server to the client computing device, wherein the received segment is separated from the main mix of the media asset;
   modifying, at the client computing device, the received segment based on the modification indicated by the user input, thereby generating a modified segment;
   receiving the main mix of the media asset in a second transmission sent from the digital signal processing server to the client computing device, wherein the first and second transmissions are distinct transmissions that are initiated at different times; and
   synchronizing the modified segment with the main mix of the media asset at the client computing device.

2. The computer-implemented method of claim 1, wherein:
   the media asset is a multi-track sound recording; and
   the segment of the media asset that is to be modified corresponds to one or more tracks comprising the multi-track sound recording.

3. The computer-implemented method of claim 1, wherein:
   the media asset is a multi-track sound recording;
   the segment of the media asset that is to be modified corresponds a selected one of a plurality of tracks comprising the multi-track sound recording; and
   receiving the segment from the digital signal processing server comprises receiving the selected track and an additional track that is paired with the selected track.

4. The computer-implemented method of claim 1, wherein the user input corresponds to touching a virtual user interface control element that forms part of a touchscreen-based digital audio workstation user interface.

5. A computer-implemented method comprising:
   receiving, from a local processing device, an indication of a segment of a media asset that is to be modified;
   segmenting the media asset into a main mix and a segmented mix, wherein the main mix excludes the segmented mix;
   sending the segmented mix to the local processing device for client-based processing in a first transmission that is initiated at a first time;
   processing the main mix, thereby generating a processed main mix; and
   sending the processed main mix to the local processing device to be synchronized with the segmented mix after the client-based processing of the segmented mix, wherein the processed main mix is sent to the local processing device in a second transmission that is distinct from the first transmission, and that is initiated at a second time that is different from the first time,
   wherein processing the main mix is performed with respect to an edit decision list corresponding to the media asset,
   wherein segmenting the media asset further comprises generating baseline processing instructions corresponding to digital signal processing that is common to both the main mix and the segmented mix, and
   wherein the baseline processing instructions are generated based on data extracted from the edit decision list.

6. The computer-implemented method of claim 1, further comprising receiving the baseline processing instructions from the digital signal processing server;
   wherein modifying the received segment at the client computing device includes modifying the received segment based on the baseline processing instructions; and wherein the baseline processing instructions have already been applied to the main mix when it is received from the digital signal processing server.

7. The computer-implemented method of claim 5, further comprising:
identifying a first track corresponding to the segment of the media asset that is to be modified; and
identifying an additional track corresponding to the segment of the media asset that is to be modified, wherein the additional track is stereophonically linked with the first track.

8. The computer-implemented method of claim 5, further comprising, in response to receiving the indication of the segment of the media asset that is to be modified, retrieving the media asset from a server-side asset storage resource.

9. A digital signal processing system comprising:
a user interface configured to receive user input at a client computing device indicating a segment of a media asset that is to be modified and a modification to the segment;
a digital signal processing server that is configured to
segment the media asset into a main mix and a segmented mix, wherein the main mix excludes the segmented mix and wherein the segmented mix includes the segment of the media asset indicated by the user input,
wherein the segmenting the media asset further comprises generating baseline processing instructions corresponding to digital signal processing that is common to both the main mix and the segmented mix, wherein the baseline processing instructions are generated based on data extracted from an edit decision list corresponding to the media asset, and
process the main mix with respect to the edit decision list;
a communication module configured to receive the segment in a first transmission received from the digital signal processing server, wherein the received segment is separated from the main mix of the media asset;
a signal processing module, executing on the client computing device, configured to process the received segment based on the modification indicated by the user input, thereby generating a modified segment; and
a synchronization module, executing on the client computing device, configured to synchronize the modified segment with the main mix of the media asset, thereby generating a synchronized media asset,
wherein the communication module is further configured to receive the main mix of the media asset in a second transmission received from the digital signal processing server, wherein the first and second transmissions are distinct transmissions that are initiated at different times.

10. The digital signal processing system of claim 9, wherein the modification is selected from a group consisting of adjustment to volume, application of a filter, and application of an audio effect.

11. The digital signal processing system of claim 9, wherein the signal processing module is further configured to generate processing change data that corresponds to the modification indicated by the user input.

12. The digital signal processing system of claim 9, further comprising an input/output controller configured to further process the synchronized media asset for playback.

13. The method of claim 1, wherein the modification is selected from a group consisting of adjustment to volume, application of a filter, and application of an audio effect.

14. The method of claim 1, further comprising:
generating processing change data that corresponds to the modification indicated by the user input; and
sending the processing change data to the digital signal processing server.

15. The method of claim 5, wherein:
the method further comprises updating the edit decision list based on processing instructions received from the local processing device.

16. The method of claim 5, wherein:
the method further comprises updating the edit decision list based on processing instructions received from the local processing device; and
the processing instructions define processing of the segmented mix performed by the local processing device.

17. The method of claim 5, wherein processing the main mix further comprises accessing supplemental processing resources provided by a networked digital signal processing hardware resource.

18. A non-transitory computer readable medium having instructions encoded thereon that, when executed by one or more processors, invoke a digital signal processing technique that comprises:
receiving, from a local processing device, an indication of a segment of a media asset that is to be modified;
segmenting the media asset into a main mix and a segmented mix, wherein the main mix excludes the segmented mix;
sending the segmented mix to the local processing device for client-based processing in a first transmission that is initiated at a first time;
processing the main mix, thereby generating a processed main mix; and
sending the processed main mix to the local processing device to be synchronized with the segmented mix after the client-based processing of the segmented mix, wherein the processed main mix is sent to the local processing device in a second transmission that is distinct from the first transmission, and that is initiated at a second time that is different from the first time,
wherein processing the main mix is performed with respect to an edit decision list corresponding to the media asset,
wherein segmenting the media asset further comprises generating baseline processing instructions corresponding to digital signal processing that is common to both the main mix and the segmented mix, and
wherein the baseline processing instructions are generated based on data extracted from the edit decision list.

19. The non-transitory computer readable medium of claim 18, wherein the digital signal processing technique further comprises:
identifying a first track corresponding to the segment of the media asset that is to be modified; and
identifying an additional track corresponding to the segment of the media asset that is to be modified, wherein the additional track is stereophonically linked with the first track.

20. The non-transitory computer readable medium of claim 18, wherein the digital signal processing technique further comprises, in response to receiving the indication of the segment of the media asset that is to be modified, retrieving the media asset from a server-side asset storage resource.

21. The non-transitory computer readable medium of claim 18, wherein the digital signal processing technique further comprises:

generating processing change data that corresponds to the modification indicated by the user input; and sending the processing change data to the digital signal processing server.

\* \* \* \* \*